US012118459B2

(12) United States Patent
Marez et al.

(10) Patent No.: US 12,118,459 B2
(45) Date of Patent: Oct. 15, 2024

(54) NEURAL NETWORK APPROACH FOR IDENTIFYING A RADAR SIGNAL IN THE PRESENCE OF NOISE

(71) Applicant: United States of America as represented by the Secretary of the Navy, San Diego, CA (US)

(72) Inventors: Diego Marez, Oceanside, CA (US); John David Reeder, San Diego, CA (US)

(*) Notice: Subject to any disclaimer, the term of this patent is extended or adjusted under 35 U.S.C. 154(b) by 763 days.

(21) Appl. No.: 17/014,475

(22) Filed: Sep. 8, 2020

(65) Prior Publication Data

US 2022/0076111 A1 Mar. 10, 2022

(51) Int. Cl.
*G06N 3/08* (2023.01)
*G01S 7/02* (2006.01)
*G01S 7/41* (2006.01)
*G06N 3/04* (2023.01)

(52) U.S. Cl.
CPC .............. *G06N 3/08* (2013.01); *G01S 7/021* (2013.01); *G01S 7/417* (2013.01); *G06N 3/04* (2013.01)

(58) Field of Classification Search
CPC ............ G06N 3/08; G06N 3/04; G06N 3/044; G06N 3/045; G06N 3/048; G06N 3/088; G06N 3/063; G01S 7/021; G01S 7/417
See application file for complete search history.

(56) References Cited

U.S. PATENT DOCUMENTS 11,448,721 B2* 9/2022 Santra .................. G01S 13/50
2021/0367681 A1* 11/2021 Hess ...................... H04B 1/123

OTHER PUBLICATIONS

Jin, Feng, Arindam Sengupta, and Siyang Cao. "mmFall: Fall Detection using 4D MmWave Radar and Variational Recurrent Autoencoder." IEEE Transactions on Automation Science and Engineering (2020). (Year: 2020).*

(Continued)

*Primary Examiner* — Miranda M Huang
*Assistant Examiner* — Sidney Vincent Bostwick
(74) *Attorney, Agent, or Firm* — Naval Information Warfare Center, Pacific; Kyle Eppele; Paul C. Oestreich (57) ABSTRACT

A self-supervised machine-learning system identifies whether an intermittent signal is present. The system includes a receiver, an encoding neural network, a decoding neural network, and a gating neural network. The receiver detects radiation and from the detected radiation generates a sampled sequence including sampled values describing the intermittent signal and noise. The encoding neural network is trained to compress each window over the sampled sequence into a respective context vector having a fixed dimension less than an incoming dimension of the window. The decoding neural network is trained to decompress the respective context vector for each window into an interim sequence describing the intermittent signal while suppressing the noise. The gating neural network is trained to produce a confidence sequence from a sigmoidal output based on the interim sequence. Despite the noise, the confidence sequence identifies whether the intermittent signal is present in each sampled value in the sampled sequence.

20 Claims, 2 Drawing Sheets (56) References Cited

OTHER PUBLICATIONS

Park, Seong Hyeon, et al. "Sequence-to-sequence prediction of vehicle trajectory via LSTM encoder-decoder architecture." 2018 IEEE intelligent vehicles symposium (IV). IEEE, 2018. (Year: 2018).*

Hazra, Souvik, and Avik Santra. "Radar gesture recognition system in presence of interference using self-attention neural network." 2019 18th IEEE International Conference On Machine Learning And Applications (ICMLA). IEEE, 2019. (Year: 2019).*

I Carretero, M. Vizcarro, R. I. A. Harmanny, and R. P. Trommel. "Smart-CFAR, a machine learning approach to floating level detection in radar." 2019 16th European Radar Conference (EuRAD). IEEE, 2019. (Year: 2019).*

Xu, Xin, et al. "Deepmad: Deep learning for magnetic anomaly detection and denoising." IEEE Access 8 (2020): 121257-121266. (Year: 2020).*

I. Sutskever, O. Vinyals, and Q. V. Le, "Sequence to Sequence Learning with Neural Networks," In Advances in neural information processing systems, pp. 3104-3112, 2014.

D. Marez, S. Borden, J. Reeder, and N. Johnson, "Seq2Seq Autoencoder for Radar Pulse Localization," Naval Information Warfare Center, Oct. 2019.

K. Cho, B. Van Merrienboer, C. Gulcehre, D. Bahdanau, F. Bougares, H. Schwenk, and Y. Bengio, "Learning phrase representations using RNN encoder-decoder for statistical machine translation," arXiv preprint arXiv:1406.1078, 2014.

D. Bahdanau, K. Cho, and Y. Bengio, "Neural machine translation by jointly learning to align and translate," arXiv preprint arXiv:1409.0473, 2014.

Y. Tang, J. Xu, K. Matsumoto, and C. Ono, "Sequence-to-sequence model with attention for time series classification," In 2016 IEEE 16th International Conference on Data Mining Workshops (ICDMW), pp. 503-510, IEEE, 2016.

S. Amiriparian, M. Freitag, N. Cummins, and B. Schuller, "Sequence to sequence autoencoders for unsupervised representation learning from audio," in Proc. of the DCASE 2017 Workshop. 2017.

K. Xu, J. Ba, R. Kiros, K. Cho, A. Courville, R. Salakhudinov, R. Zemel, and Y. Bengio, "Show, attend and tell: Neural image caption generation with visual attention," in International conference on machine learning, pp. 2048-2057, 2015.

N. Jaitly, Q. V. Le, O. Vinyals, I. Sutskever, D. Sussillo, and S. Bengio, "An online sequence-to-sequence model using partial conditioning," in Advances in Neural Information Processing Systems, pp. 5067-5075, 2016.

J. Liu, J. P. Lee, L. Li, Z.-Q. Luo, and K. M. Wong, "Online clustering algorithms for radar emitter classification," IEEE transactions on pattern analysis and machine intelligence, vol. 27, No. 8, pp. 1185-1196, 2005.

D. Marez, S. Borden, G. Clarke, J. Reeder, and N. Johnson, "Radar emitter and activity identification using deep clustering methods," in Artificial Intelligence and Machine Learning for Multi-Domain Operations Applications, vol. 11006, p. 110061H, International Society for Optics and Photonics, 2019.

W.-C. Hung, V. Jampani, S. Liu, p. Molchanov, M.-H. Yang, and J. Kautz, "Scops: Self-supervised co-part segmentation," in Proceedings of the IEEE Conference on Computer Vision and Pattern Recognition, pp. 869-878, 2019.

C. Doersch, A. Gupta, and A. A. Efros, "Unsupervised visual representation learning by context prediction," in Proceedings of the IEEE International Conference on Computer Vision, pp. 1422-1430, 2015.

C. Vondrick, A. Shrivastava, A. Fathi, S. Guadarrama, and K. Murphy, "Tracking emerges by colorizing videos," in Proceedings of the European Conference on Computer Vision (ECCV), pp. 391-408, 2018.

J. Y. Jason, A. W. Harley, and K. G. Derpanis, "Back to basics: Unsupervised learning of optical flow via brightness constancy and motion smoothness," in European Conference on Computer Vision, pp. 3-10, Springer, 2016.

Y.-H. Wang, C.-T. Chung, and H.-Y. Lee, "Gate activation signal analysis for gated recurrent neural networks and its correlation with phoneme boundaries," Proc. Interspeech 2017, pp. 3822-3826, 2017.

S. Hochreiter and J. Schmidhuber, "Long short-term memory," Neural computation, vol. 9, No. 8, pp. 1735-1780, 1997.

P. Vincent, H. Larochelle, I. Lajoie, Y. Bengio, and P.-A. Manzagol, "Stacked denoising autoencoders: Learning useful representations in a deep network with a local denoising criterion," Journal of machine learning research, vol. 11, No. Dec, pp. 3371-3408, 2010.

G. Pereyra, G. Tucker, J. Chorowski, L. Kaiser, and G. Hinton, "Regularizing neural networks by penalizing confident output distributions," arXiv preprint arXiv:1701.06548, 2017.

P. Vincent, H. Larochelle, Y. Bengio, and P.-A. Manzagol, "Extracting and composing robust features with denoising autoencoders," in Proceedings of the 25th international conference on Machine learning, pp. 1096-1103, ACM, 2008.

D. P. Kingma and J. Ba, "Adam: A method for stochastic optimization," arXiv preprint arXiv:1412.6980, 2014.

Abadi, M., et al. "Tensorflow: Large-scale machine learning on heterogeneous distributed systems." arXiv preprint arXiv:1603.04467 (2016).

C. Trabelsi, O. Bilaniuk, Y. Zhang, D. Serdyuk, S. Subramanian, J. F. Santos, S. Mehri, N. Rostamzadeh, Y. Bengio, and C. J. Pal, "Deep complex networks," arXiv preprint arXiv:1705.09792, 2017.

N. Monning and S. Manandhar, "Evaluation of complex-valued neural networks on real-valued classification tasks," arXiv preprint arXiv:1811.12351, 2018.

* cited by examiner

NEURAL NETWORK APPROACH FOR IDENTIFYING A RADAR SIGNAL IN THE PRESENCE OF NOISE

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 111413.

BACKGROUND OF THE INVENTION

Localizing a radar signal in noise is one of the fundamental problems in radar system design. The best performing methods typically incorporate knowledge about the radar pulse shape and other characteristics. However, in a spectrum monitoring setting, radar signal detection is especially difficult if the radar pulse shape is unknown.

For successful training, a machine learning system generally requires large datasets labeled with the desired outputs expected during normal operation after training. Such large labeled datasets are often unavailable, especially for radar applications.

SUMMARY

Without prior knowledge of radar pulse shape, a self-supervised machine-learning system identifies whether a radar or intermittent signal is present in a sequence of sampled values from a receiver. The system includes the receiver, an encoding neural network, a decoding neural network, and a gating neural network. The receiver detects radiation and generates a sampled sequence from the radiation. The sampled sequence includes sampled values describing the radar or intermittent signal and noise. The encoding neural network is trained to compress each window over the sampled sequence into a respective context vector having a fixed dimension less than an incoming dimension of the window. The decoding neural network is trained to decompress the respective context vector for each window into an interim sequence describing the radar or intermittent signal while suppressing the noise. The gating neural network is trained to produce a confidence sequence from a sigmoidal output based on the interim sequence. Despite the noise, the confidence sequence identifies whether the radar or intermittent signal is present in each sampled value in the sampled sequence.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
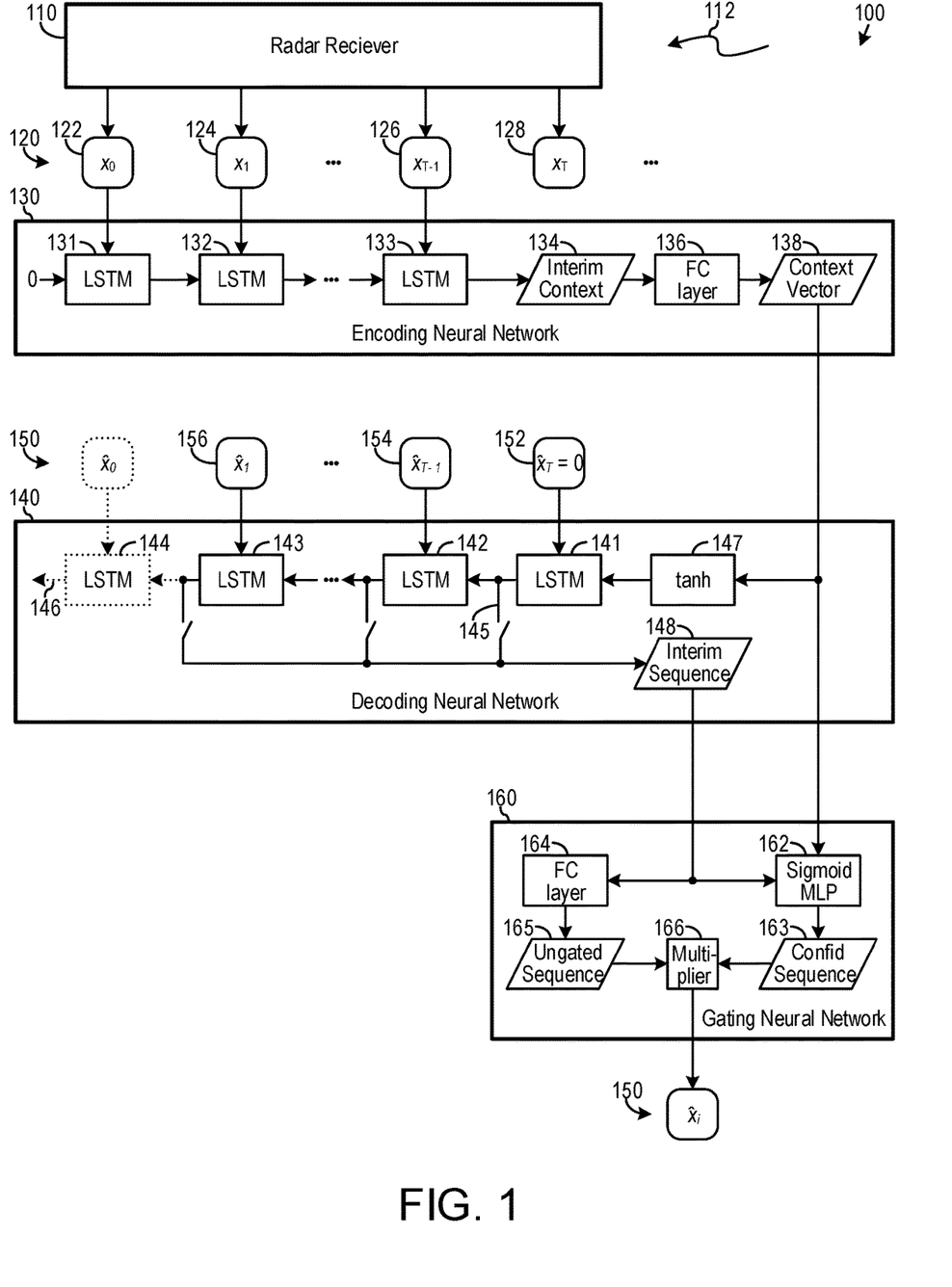
FIG. 1 is a temporally-unrolled block diagram of a system for identifying whether a radar signal is present in accordance with an embodiment of the invention.

FIG. 1 is a temporally-unrolled block diagram of a system 100 for identifying whether a radar signal is present in accordance with an embodiment of the invention. The system 100 is a self-supervised machine-learning system.

A radar receiver 110 detects radar radiation 112 and generates a sampled sequence 120 from the radar radiation 112. The sampled sequence 120 describes a radar signal and noise. The sampled sequence 120 includes sampled values 122 and 124 through 126 and 128. A first window of the sampled sequence 120 includes sampled values 122 and 124 through 126 with respective indices 0 and 1 through T. A second window of the sampled sequence 120 begins at sampled value 128 with index T within the sampled sequence 120, but with index 0 within the second window. Thus, sampled value 128 effectively becomes sampled value 122 when the system 100 transitions from processing the first window to processing the second window.

In one embodiment, a format of each sampled value of the sampled sequence 120 is a scalar value specifying a periodically sampled amplitude of the radar signal with the noise. In another embodiment, a format of each sampled value of the sampled sequence 120 is a periodically sampled in phase and quadrature (IQ) value specifying an amplitude and a phase of the radar signal with the noise.

The system 100 includes an encoding neural network 130, a decoding neural network 140, and a gating neural network 160. The operation of system 100 is outlined in the following equations:

$$\text{Encode: } e_i = f(x_{i-1}, e_{i-1}) \text{ for } 0 < i \leq T \text{ with } e_0 = 0$$

$$\text{Context: } c = z(e_T)$$

$$\text{Decode: } d_{T-1} = g(0, c) \text{ and } d_i = g(\hat{x}_{i+1}, d_{i+1}) \text{ for } T-1 > i \geq 0$$

$$\text{Gate: } \hat{x}_i = h(d_i) \times r(d_i, c) \text{ for } T > i \geq 0$$

where $x_i$ are the T sampled values within each window of the sampled sequence, $e_i$ are the encoded values, f is a recurrent neural network such as a Long Short Term Memory (LSTM), z is a neural network such as a linear fully connected (FC) layer, c is the context vector, $d_i$ are the decoded interim values, g is a recurrent neural network such as a LSTM, h is a neural network such as a FC layer, r is a neural network such as a multi-layer perceptron (MLP) with a sigmoidal output giving confidence values that the radar or intermittent signal is present, and $\hat{x}_i$ are the reconstructed values. This is for an embodiment in which the decode $d_i$ are generated in the reversed index order from the encode $e_i$. In another embodiment, $d_0 = g(\hat{x}_{-1}, c)$ and $d_i = g(\hat{x}_{i-1}, d_{i-1})$ for $0 < i < T$, with $\hat{x}_{-1}$ equaling $\hat{x}_{T-1}$ from any preceding window.

The encoding neural network 130 is trained to compress each of the windows having T sampled values within the sampled sequence 120 into a respective context vector 138 having a fixed dimension less than an incoming dimension of the window of the sampled sequence 120. For example, the T sampled values 122 and 124 through 126 of the first window are each scalar values having a specified precision, and the respective context vector 138 includes less than T values each having the same precision. Because of this information bottleneck, the respective context vector 138 cannot generally fully describe the T sampled values of the first window, such that the respective context vector 138 is a compression of the sampled values 122 and 124 through 126 of the first window. Subsequent windows of the sampled sequence 120 are similarly compressed into a respective context vector.

During training discussed below for FIG. 2, the self-supervised machine-learning system 100 learns to produce the respective context vector 138 for each window over the sampled sequence 120 that describes the window as much as possible given the information bottleneck. Because the randomness of prevalent sources of typical noise requires significant descriptive information, the noise is generally suppressed in the respective context vector 138 due to the information bottleneck. The training includes an additional technique to suppress noise in an intermittent signal further as discussed below for FIG. 2.

The encoding neural network 130 includes a Long Short Term Memory (LSTM). For clarity, the LSTM is shown temporally-unrolled with LSTM 131 and 132 through 133. Although LSTM 131 and 132 through 133 could be physically different components, in one embodiment LSTM 131 and 132 through 133 are the same LSTM component at different time steps. Thus, LSTM 131 and 132 through 133 are a single LSTM component with its time iteration unrolled. At LSTM 131, the LSTM component receives sampled value 122 and outputs a value that is recycled into the LSTM component at the next time step when at LSTM 132 the LSTM component receives sampled value 124. This continues with the output of LSTM component recycled for each sampled value in the window until at LSTM 133 the LSTM component receives the sampled value 126 and outputs the interim context vector 134. Thus, the LSTM component at 131 and 132 through 133 is trained to compress each window of the sampled sequence 120 into the interim context vector 134.

The encoding neural network 130 also includes a linear fully connected (FC) layer 136 trained to generate the respective context vector 138 for each window from the interim context vector 134. FC layer 136 is optional, but allows the respective context vector 138 for each window to preserve more information than when the FC layer 136 is omitted (the interim context vector 134 then becoming the respective context vector 138). Perhaps this is because the FC layer 136 permits emphasizing the more descriptive combinations of the information in the interim context vector 134, even when the interim context vector 134 and the context vector 138 have the same dimensionality. The encoding neural network 130 processes all of the sampled values in each window of the sampled sequence 120 into the respective context vector 138 before the decoding neural network 140 begins decompressing the respective context vector 138.

The decoding neural network 140 is trained to decompress a hyperbolic tangent 147 of the respective context vector 138 for each window of the sampled sequence 120 into an interim sequence 148 describing the radar signal while suppressing the noise. The hyperbolic tangent 147 is optional (and not included in the above equations). Like the encoding neural network 130, the decoding neural network 140 includes a single LSTM component with its time iteration unrolled at LSTM 141 and 142 through 143 and 144. Unlike the encoding neural network 130, the output of the LSTM component is sent to the interim sequence 148 every time step. Thus, although there is one context vector 138 for each window over the sampled sequence 120, the interim sequence 148 instead includes a respective interim vector for each sampled value in the sampled sequence 120.

Typically, but not necessarily, each interim vector in the interim sequence 148 has the same fixed dimension as the entire context vector 138. Then, the T interim vectors in the interim sequence 148 have an excess of the dimensionality needed to describe the T sampled values 122 and 124 through 126 of the window of the sampled sequence 120. The decoding neural network 140 and the gating neural network 160 cooperate to reconstruct an estimate of the sampled sequence 120 from the interim sequence 148, but with noise suppressed in the radar signal.

In the embodiment shown in FIG. 1, the decoding neural network 140 generates the interim sequence 148 that is time reversed. This time-reversed embodiment helps expedite training as mentioned below. The initial interim vector 145 generated at iteration LSTM 141 corresponds to sampled value 126 having index T−1. The single LSTM component successively generates the interim vectors in the interim sequence 148 with index T−1 at iteration LSTM 141 and index T−2 at iteration LSTM 142 through index 0 at iteration LSTM 143 and index −1 at iteration LSTM 144. Iteration LSTM 144 is omitted in this embodiment because the interim vector 146 generated at iteration LSTM 144 is discarded.

In the time-reversed embodiment of FIG. 1, generation of the reconstructed sequence 150 begins with an estimate of zero for the reconstructed value 152 with index T beyond the end of the window (corresponding to sampled value 128 of the next window). Note that in another embodiment that is not time reversed, the estimate for the initial reconstructed value of the current window is the final reconstructed value of the preceding window. From the estimate for the reconstructed value 152 with index T, LSTM 141 generates interim vector 145 having index T−1, and from this, gating neural network 160 generates reconstructed value 154 with index T−1, which feeds back into the decoding neural network 140. This continues until LSTM 143 generates an interim vector having index 0 from reconstructed value 156 with index 1. Thus, the decoding neural network 140 and the gating neural network 160 iterate together to generate each reconstructed value in the reconstructed sequence 150 from another reconstructed value in the reconstructed sequence 150.

The gating neural network 160 includes a multi-layer perceptron (MLP) 162. The MLP 162 is trained to produce confidence values of a confidence sequence 163 from applying a multi-layer perceptron and a sigmoidal output to the interim vectors in the interim sequence 148. Optionally, the MLP 162 is trained to produce the confidence values of the confidence sequence 163 from applying the multi-layer perceptron and the sigmoidal output to a combination of the interim sequence 148 and the respective context vector 138 for each window. Despite the noise, the confidence sequence 163 identifies whether the radar signal is present at each sampled value in the sampled sequence 120. More generally, the confidence sequence 163 identifies whether an intermittent signal is present at each sampled value in the sampled sequence 120. In one example, for each sampled value in the sampled sequence 120, a respective confidence value in the confidence sequence 163 specifies a probability in a range between 0 and 1 that the intermittent signal is present in the sampled value.

Thus, the MLP 162 is a form of attention that enables the system 100 to learn when to focus on reconstructing the intermittent signal. In one embodiment when the averaged output of the MLP 162 over a window is above a user-specified threshold with a default of 0.9, the window is considered to contain a radar pulse or other intermittent signal. If a window is flagged with a pulse, a binary mask is created from those sampled values above and below another user-specified threshold with a default of 0.7, and otherwise a mask of all zeroes is created for the window. Thus, noise is completely suppressed down to zero between the pulses. The mask is the output of the MLP 162.

The gating neural network 160 also includes an FC layer 164 and a multiplier 166. The FC layer 164 is trained to generate ungated values of an ungated sequence 165 from applying an activation, such as a rectified linear unit (ReLU), to the interim vectors in the interim sequence 148. Multiplier 166 generates the respective reconstructed value in the reconstructed sequence 150 for each sampled value in the sampled sequence 120 as a product of a respective confidence value for the sampled value in confidence sequence 163 and a respective ungated value for the sampled value in the ungated sequence 165. The reconstructed sequence 150 feeds back during its generation into decoding neural network 140.

The reconstructed sequence 150 is an output of the self-supervised machine-learning system 100 describing the radar signal while suppressing the noise. In one embodiment, a digital format of each sampled value of the sampled sequence 120 and a digital format of each reconstructed value in the reconstructed sequence 150 are a scalar value specifying an amplitude of the radar signal. In another embodiment, these digital formats of the sampled and reconstructed values are each an IQ value specifying an amplitude and a phase of the radar signal.

Figure 2:
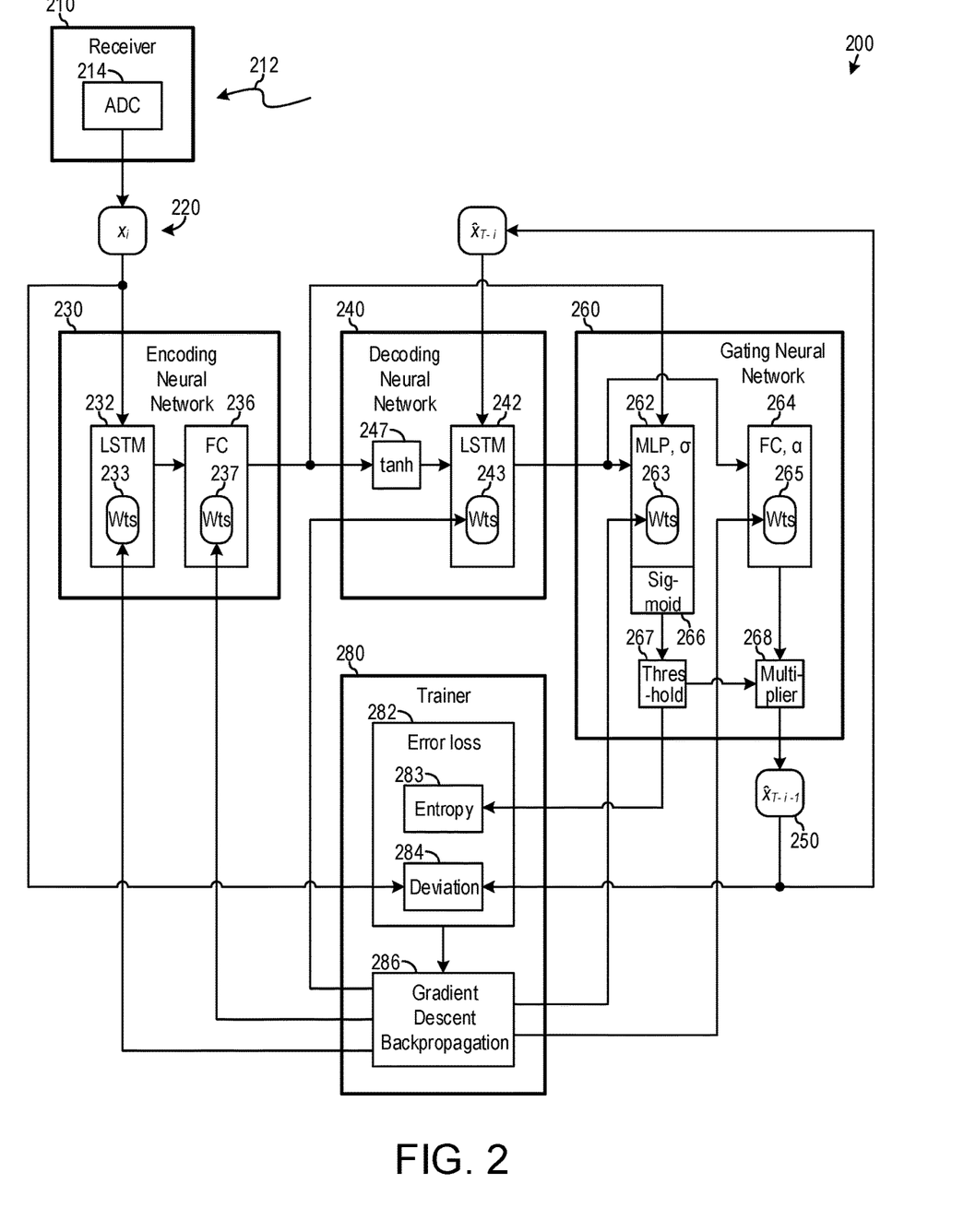
FIG. 2 is a block diagram of a system being trained to identify whether an intermittent signal is present in accordance with an embodiment of the invention.

FIG. 2 is a block diagram of a system 200 being trained to identify whether an intermittent signal is present in radiation 212 accordance with an embodiment of the invention.

A receiver 210 detects the radiation 212 and includes an analog-to-digital converter 214 that converts an analog format of the radiation 212 as detected by receiver 210 into a digital format of the sampled values of the sampled sequence 220. The sampled sequence 220 describes the intermittent signal and noise.

An encoding neural network 230 includes Long Short-Term Memory (LSTM) 232 and a linear fully connected (FC) layer 236 having respective encoding weights 233 and 237 for their neural networks. A decoding neural network 240 includes a hyperbolic tangent 247 and LSTM 242 having decoding weights 243 for its neural network. A gating neural network 260 includes multi-layer perceptron (MLP) 262 with a sigmoidal output 266 and a FC layer 264 having respective gating weights 263 and 265 for their neural networks. The gating neural network 260 also includes a binary mask threshold 267 and a multiplier 268. The gating neural network 260 is trained to generate reconstructed sequence 250, which is iteratively fed back during its generation into decoding neural network 240.

Trainer 280 trains the encoding, decoding, and gating neural networks 230, 240, and 260 by adjusting encoding weights 233 and 237, decoding weights 243, and gating weights 263 and 265, so that an error loss 282 between the sampled sequence 220 and the reconstructed sequence 250 becomes optimized during training using an unlabeled training sequence for the sampled sequence 220. The trainer 280 adjusts the encoding weights 233 and 237, decoding weights 243, and gating weights 263 and 265 through gradient descent backpropagation 286 of the error loss 282 between the sampled sequence 220 and the reconstructed sequence 250.

Through this training an unlabeled training sequence, system 200 learns values of the various weights 233, 237, 243, 263, and 265 that faithfully reconstruct the reconstructed sequence 250 from the sampled sequence 220 within the constraints imposed by the information bottleneck between the encoding neural network 230 and the decoding neural network 240. It is believed that time reversal in the decoding neural network 240 assists training due to the short separation between the first-generated reconstructed value at the end of each window and the last-generated interim vector at the beginning of the window, and this short separation enhances the correlations that are extracted within the weights 233, 237, 243, 263, and 265.

The error loss 282 between the sampled sequence 220 and the reconstructed sequence 250 includes a weighted combination of an entropy 283 of the confidence sequence from MLP 262 with the sigmoidal output 266 after performing a binary mask threshold 267, and a deviation 284 between the sampled sequence 220 and the reconstructed sequence 250. The entropy 283 of the confidence sequence is weighted to increase the error loss 282 when the confidence sequence has low entropy. The deviation between the sampled sequence 220 and the reconstructed sequence 250 is a mean squared sum of a difference magnitude between each sampled value in the sampled sequence 220 and the respective reconstructed value for the sampled value in the reconstructed sequence 250.

In one embodiment, the error loss 282 implements the following equation:

$$L = \frac{1}{2TN}\sum_{i}^{TN}\|x_i - \hat{x}_i\|_2^2 + \frac{\beta}{TN}\sum_{n}^{N}\max(0, \Gamma - H(\vec{r}_n))$$

where T is the number of sampled values in each window, N is the number of possibly-overlapping windows in the training sequence, $x_i$ are the sampled values of the training sequence, $\hat{x}_i$ are the reconstructed values for the training sequence, $\beta$ is a loss coefficient, $\Gamma$ is an entropy cutoff threshold, H is a binary entropy operator over each of the N windows, and $\vec{r}_n$ is the T confidence values that the radar or intermittent signal is present at the sampled values within each the N windows. The first term in the above equation is the deviation 284. The second term is the entropy 283 that penalizes confidence values with low entropy, such as a series of confidence values giving probabilities of all zero or all one. Thus, the entropy 283 favors confidence values providing on/off transitions. $\beta$ specifies the relative weight between the entropy 283 and the deviation 284.

In an example implementation, a dataset includes approximately 50,000 sampled values each having an in-phase and quadrature (IQ) digital format from sampling radiation from an unknown radar. The radiation from the unknown radar includes radar pulses that have varying pulse width, frequency, and power levels. The dataset is normalized by subtracting the mean I and Q values over the whole dataset and dividing by the standard deviation of the I and Q channels, respectively. Zero-mean white Gaussian noise with a standard deviation randomly selected within the range [0, 0.07] was added to the dataset. The training sequence oversamples this dataset, with each iteration of oversampling randomly shifting the dataset by up to 100 sampled values with zero padding and then splitting the shifted result into overlapping windows of T=441 sampled values with a stride of 180 sampled values.

During training, an Adam optimizer was used for the gradient descent backpropagation 286 for weights 233, 237, 243, 263, and 265 with a learning rate of $10^{-4}$ and a batch size of 128 for approximately 25,500 windows of the training sequence. The gradients during backpropagation were clipped to values between [−1, 1]. The dimensionality of the context vector was set to 50 scalar values. The multi-layer perceptron (MLP) of the gating neural network includes a single layer with 100 hidden nodes followed by rectified linear unit (ReLU) activation. The example self-supervised machine-learning system 200 was implemented in Tensorflow on an nVidia Tesla v100 GPU.

The results of four variants were compared. Two baseline systems omit FC layer 136 of the encoding neural network 130 and omit the multi-layer perceptron (MLP) 162 and multiplier 166 generating the confidence values from the gating neural network 160. The Baseline-Small system has a context vector dimensionality of 50 scalar values and 23,852 weight parameters. The Baseline-Big system has a context vector dimensionality of 200 scalar values and 365,402 weight parameters. Two gated systems as shown in FIG. 1 have a context vector dimensionality of 50 scalar values and 34,053 weight parameters. The Gated-No-Entropy system omits entropy 283 from error loss 282. The Gated-Entropy system includes entropy 283 with β=1 and Γ=0.1.

TABLE 1

| | Mean Squared Error | | |
|---|---|---|---|
| Model | Train | Validation | Test |
| Baseline-Small | 0.1677 | 0.1704 | 0.1668 |
| Baseline-Big | 0.0963 | 0.0965 | 0.0955 |
| Gated-No-Entropy | 0.0822 | 0.0831 | 0.0812 |
| Gated-Entropy | 0.1174 | 0.1181 | 0.1164 |

Table 1 above shows the mean squared error for the four variants. The Gated-No-Entropy system achieves slightly better performance than the Baseline-Big system using dramatically fewer weight parameters, and achieves significantly better performance than the Baseline-Small system having a similar numbers of weight parameters. Generating confidence values from MLP 162 in the gating neural network 160 enables quick learning of the "on/off" behavior of intermittent signals, such that the Gated-No-Entropy and Gated-Entropy systems quickly converge to a solution with a low mean squared error. In contrast, the Baseline-Big system shows instability with large unpredictable spikes in mean squared error during training. This implies that the Baseline-Big system is more difficult to optimize.

Manual comparison between the dataset before adding the zero-mean white Gaussian noise with a standard deviation of σ=0.05 and the confidence values generated in the gating neural network 160 shows that, despite the noise, the confidence values accurately identify when the radar signal is present using a binary mask threshold of 0.7.

From the receiver operating characteristic (ROC) including measuring the area under curve (AUC) of the ROC plotting false positive rate versus true positive rate, the Gated-Entropy system achieves a superior AUC ROC as compared with the Gated-No-Entropy system as shown below in Table 2. The entropy 283 of error loss 282 inserts a degree of prior knowledge during training that enables achieving a superior ROC with a good balance between the false positive rate and the true positive rate. Importantly, these excellent results were achieved in self-supervised machine-learning system 200 that does not need labeled data.

TABLE 2

| | Area Under Curve (AUC) of Receiver Operating Characteristic (ROC) | | |
|---|---|---|---|
| Model | Train | Validation | Test |
| Gated-No-Entropy | 0.7034 | 0.6960 | 0.7038 |
| Gated-Entropy | 0.8206 | 0.8142 | 0.8216 |

From the above description of the Neural Network Approach for Identifying a Radar Signal in the Presence of Noise, it is manifest that various techniques may be used for implementing the concepts of system 100 or 200 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that system 100 or 200 is not limited to the particular embodiments described herein, but is capable of many embodiments without departing from the scope of the claims.

We claim:

1. A radar signal detection system, comprising: a receiver, comprising:
   an antenna for receiving radar radiation in an analog format;
   an analog-to-digital converter for converting the received analog radiation into a digitally formatted plurality of sampled values of a sampled sequence, the sampled sequence describing a radar signal and noise;
   and the receiver further segmenting the plurality of sampled values into a plurality of windows;
   a trained encoding neural network, comprising:
      an encoding long short term memory (LSTM) compressing each window of the plurality of windows over the sampled sequence into a respective interim context vector;
      and a first linear fully connected layer receiving the respective interim context vector and generating a respective context vector having a fixed dimension less than an incoming dimension of each window of the plurality of windows over the sampled sequence;
   a trained decoding neural network, comprising:
      a hyperbolic tangent module for receiving the respective context vector and outputting a hyperbolic tangent of the respective context vector;
      a decoding LSTM receiving and decompressing the hyperbolic tangent of the respective context vector for each window of the plurality of windows, beginning with a zero estimate for a last reconstructed value in the window, into an interim sequence which is time reversed from the window over the sampled sequence; and
   a trained gating neural network, comprising:
      a multi-layer perceptron receiving the interim sequence and producing a confidence sequence from a sigmoidal output;
      a second linear fully connected layer generating ungated values of an ungated sequence by applying an activation to respective interim vectors in the interim sequence;

a multiplier receiving the ungated sequence and the confidence sequence and generating a respective reconstructed value in the reconstructed sequence for each sampled value in the sampled sequence as a product of a respective confidence value for the sampled value in the confidence sequence and a respective ungated value for the sampled valued in the ungated sequence;

and wherein the reconstructed sequence feeds back to a next estimate for a reconstructed value in the decoding neural network; and the system outputting a reconstructed sequence representing the radar signal with the noise suppressed when a radar signal is detected from the received analog radar radiation and noise for a user of the system.

2. The system according to claim 1, wherein a format of the sampled values of the sampled sequence is selected from a group including a scalar amplitude value of the radar signal with the noise and an in-phase and quadrature (IQ) value specifying an amplitude and a phase of the radar signal with the noise.

3. The system according to claim 2, wherein a digital format of the reconstructed values in the reconstructed sequence is also selected from the group including a scalar amplitude value of the radar signal with the noise suppressed and an IQ value specifying an amplitude and a phase of the radar signal with the noise suppressed.

4. The system according to claim 1, wherein the interim sequence further includes a plurality of interim vectors including a respective interim vector for each of the sampled values in the sampled sequence, the interim vectors each having the fixed dimension.

5. The system according to claim 1, wherein the activation comprises a rectified linear unit.

6. The system according to claim 1, further operating according to equations:

Encode: $e_i = f(x_{i-1}, e_{i-1})$ for $0 < i \leq T$ with $e_0 = 0$

Context: $c = z(e_T)$

Decode: $d_{T-1} = g(0, c)$ and $d_i = g(\hat{x}_{i+1}, d_{i+1})$ for $T-1 > i \geq 0$ Gate: $\hat{x}_i = h(d_i) \times r(d_i, c)$ for $T > i \geq 0$ where $x_i$ are T of the sampled values within each window of the sampled sequence, $e_i$ are encoded values, f is the encoding long short term memory, z is the first linear fully connected layer, c is a context vector, $d_i$ are decoded interim values generated in reversed index order from $e_i$, g is the decoding long short term memory, h is the second linear fully connected layer, r is the multi-layer perceptron with a sigmoidal output generating the confidence values that the unknown radar signal is present, and $\hat{x}_i$ are the reconstructed values.

7. A system for training and improving a radar signal detection system with an unlabeled training sequence of an unknown radar signal and noise to reconstruct a radar signal if present in radiation with noise, the radar signal detection system including an antenna for receiving radiation in an analog format and an analog-to-digital converter for digitally sampling the received analog radiation, the unlabeled training sequence including a digitally sampled sequence of an unknown radar radiation and noise, the digitally sampled sequence including a plurality of sampled values describing a radar signal and the noise, the plurality of sampled values divided into a plurality of windows, the system for training and improving the radar signal detection system comprising:

an encoding neural network, comprising:
a weighted encoding long short term memory (LSTM) compressing each window of the plurality of windows over the sampled sequence into a respective interim context vector; and a weighted first linear fully connected layer receiving the respective interim context vector and generating a respective context vector having a fixed dimension less than an incoming dimension of each window of the plurality of windows over the sampled sequence;

a decoding neural network, comprising:
a hyperbolic tangent module for receiving the respective context vector and outputting a hyperbolic tangent of the respective context vector;
a weighted decoding LSTM receiving and decompressing the hyperbolic tangent of the respective context vector for each window of the plurality of windows, beginning with a zero estimate for a last reconstructed value in the window, into an interim sequence which is time reversed from the window over the sampled sequence;

and a gating neural network, comprising:
a weighted multi-layer perceptron receiving the interim sequence and producing a confidence sequence from a sigmoidal output;
a binary mask threshold masking the confidence sequence; a weighted second linear fully connected layer generating ungated values of an ungated sequence by applying an activation to respective interim vectors in the interim sequence;
a multiplier receiving the ungated sequence and the masked confidence sequence and generating a respective reconstructed value in the reconstructed sequence for each sampled value in the sampled sequence as a product of a respective confidence value for the sampled value in the confidence sequence and a respective ungated value for the sampled valued in the ungated sequence;
and wherein the reconstructed sequence feeds back to a next estimate for a reconstructed value in the decoding neural network;

and a trainer in communication with the encoding neural network, the decoding neural network and the gating neural network, the trainer comprising:
an error loss between the sampled sequence and the reconstructed sequence;
and a gradient descent backpropagation receiving the calculated error loss and adjusting weighting of:
the weighted encoding LSTM;
the weighted first linear fully connected layer; the weighted decoding LSTM; the weighted multi-layer perceptron;
and the weighted second linear fully connected layer;
and the trainer optimizing the calculated error loss via the adjusted weighting performed by the gradient descent backpropagation module;

the system outputting a trained encoding neural network, a trained decoding neural network and a trained gating neural network for use in a radar signal detection system.

8. The system for training according to claim 7, wherein the error loss further comprises a weighted combination of an entropy of the masked confidence sequence from the weighted multi-layer perceptron with sigmoidal output and a deviation between the sampled sequence and the reconstructed sequence.

9. The system for training according to claim 7, wherein the error loss, L, may be calculated according to equation:

$$L = \frac{1}{2TN}\sum_{i}^{TN}\|x_i - \hat{x}_i\|_2^2 + \frac{\beta}{TN}\sum_{n}^{N}\max(0, \Gamma - H(\vec{r_n}))$$

where T is number of sampled values in each window, N is number of possibly-overlapping windows in the training sequence, $x_i$ are the sampled values of the training sequence, $\hat{x}_i$ are the reconstructed values for the training sequence, $\beta$ is a loss coefficient, $\Gamma$ is an entropy cutoff threshold, H is a binary entropy operator over each of N of the plurality of windows, and $\vec{r_n}$ represents T of the confidence values that the unknown radar signal is present at the sampled values within each the N windows.

10. The system for training according to claim 7, wherein the gradient descent backpropagation module comprises an Adam optimizer.

11. The system according to claim 7, wherein the trainer is adapted to adjust the encoding, decoding, and gating weights through gradient descent backpropagation of the error loss between the sampled sequence and the reconstructed sequence.

12. The system for training according to claim 7, wherein the error loss between the sampled sequence and the reconstructed sequence includes a weighted combination of an entropy of the confidence sequence and a deviation between the sampled sequence and the reconstructed sequence.

13. The system for training according to claim 12, wherein the entropy of the confidence sequence is weighted to increase the error loss when the confidence sequence has low entropy, and the deviation between the sampled sequence and the reconstructed sequence is a mean squared sum of a difference magnitude between each sampled value of the sampled values and the respective one of the reconstructed values for the sampled value.

14. A method for training a self-supervised machine-learning system to improve a radar signal detection system used to sample radiation, detect an unknown radar signal and reconstruct the unknown radar signal even in the presence of noise, the method comprising:
providing the radar signal detection system, comprising:
a radiation receiver, comprising:
an antenna for receiving the radiation in an analog format;
an analog-to-digital converter for converting the received analog radiation into a digitally formatted plurality of sampled values of a sampled sequence, the sampled sequence describing the unknown radar signal and the noise;
and the receiver further segmenting the plurality of sampled values into a plurality of windows;
providing the self-supervised machine-learning system in communication with the radar signal detection system, the self-supervised machine-learning system, comprising:
an encoding neural network, comprising:
a weighted encoding long short term memory (LSTM) compressing each window of the plurality of windows over the sampled sequence into a respective interim context vector;
and a weighted first linear fully connected layer receiving the respective interim context vector and generating a respective context vector having a fixed dimension less than an incoming dimension of each window of the plurality of windows over the sampled sequence;
a decoding neural network, comprising: a hyperbolic tangent module for receiving the respective context vector and outputting a hyperbolic tangent of the respective context vector;
a weighted decoding LSTM receiving and decompressing the hyperbolic tangent of the respective context vector for each window of the plurality of windows, beginning with a zero estimate for a last reconstructed value in the window, into an interim sequence which is time reversed from the window over the sampled sequence;
and a gating neural network, comprising:
a weighted multi-layer perceptron receiving the interim sequence and producing a confidence sequence from a sigmoidal output;
a binary mask threshold masking the confidence sequence;
a weighted second linear fully connected layer generating ungated values of an ungated sequence by applying an activation to respective interim vectors in the interim sequence;
a multiplier receiving the ungated sequence and the masked confidence sequence and generating a respective reconstructed value in the reconstructed sequence for each sampled value in the sampled sequence as a product of a respective confidence value for the sampled value in the confidence sequence and a respective ungated value for the sampled valued in the ungated sequence;
and wherein the reconstructed sequence feeds back to a next estimate for a reconstructed value in the decoding neural network;
and a trainer in communication with the encoding neural network, the decoding neural network and the gating neural network, the trainer comprising:
an error loss between the sampled sequence and the reconstructed sequence;
and a gradient descent backpropagation receiving the calculated error loss and adjusting weighting of: the weighted encoding LSTM;
the weighted first linear fully connected layer; the weighted decoding LSTM;
the weighted multi-layer perceptron;
and the weighted second linear fully connected layer;
and the trainer optimizing the calculated error loss via the adjusted weighting performed by the gradient descent backpropagation module;
the self-supervised machine-learning system outputting a trained encoding neural network, a trained decoding neural network and a trained gating neural network for use in the radar signal detection system.

15. The method for training according to claim 14, wherein the error loss, L, may be calculated according to equation:

$$L = \frac{1}{2TN}\sum_{i}^{TN}\|x_i - \hat{x}_i\|_2^2 + \frac{\beta}{TN}\sum_{n}^{N}\max(0, \Gamma - H(\vec{r_n}))$$

where T is number of sampled values in each window, N is number of possibly-overlapping windows in the training sequence, $x_i$ are the sampled values of the training sequence, $\hat{x}_i$ are the reconstructed values for the training sequence, β is a loss coefficient, Γ is an entropy cutoff threshold, H is a binary entropy operator over each of N of the plurality of windows, and $\vec{r}_n$ represents T of the confidence values that the unknown radar signal is present at the sampled values within each the N windows.

16. The method for training according to claim 14, wherein the gradient descent backpropagation module comprises an Adam optimizer.

17. The method for training according to claim 14, wherein the trainer is adapted to adjust the encoding, decoding, and gating weights through gradient descent backpropagation of the error loss between the sampled sequence and the reconstructed sequence.

18. The method for training according to claim 14, wherein the error loss between the sampled sequence and the reconstructed sequence includes a weighted combination of an entropy of the confidence sequence and a deviation between the sampled sequence and the reconstructed sequence.

19. The method for training according to claim 18, wherein the entropy of the confidence sequence is weighted to increase the error loss when the confidence sequence has low entropy, and the deviation between the sampled sequence and the reconstructed sequence is a mean squared sum of a difference magnitude between each sampled value of the sampled values and the respective one of the reconstructed values for the sampled value.

20. The method for training according to claim 14, wherein the self-supervised machine-learning system further operates according to equations:

Encode: $e_i = f(x_{i-1}, e_{i-1})$ for $0 < i \leq T$ with $e_0 = 0$

Context: $c = z(e_T)$

Decode: $d_{T-1} = g(0, c)$ and $d_i = g(\hat{x}_{i+1}, d_{i+1})$ for $T-1 > i \geq 0$ Gate: $\hat{x}_i = h(d_i) \times r(d_i, c)$ for $T > i \geq 0$ where $x_i$ are T of the sampled values within each window of the sampled sequence, $e_i$ are encoded values, f is the encoding long short term memory, z is the first linear fully connected layer, c is a context vector, $d_i$ are decoded interim values generated in reversed index order from $e_i$, g is the decoding long short term memory, h is the second linear fully connected layer, r is the multi-layer perceptron with a sigmoidal output generating the confidence values that the unknown radar signal is present, and $\hat{x}_i$ are the reconstructed values.

* * * * *